United States Patent
Ye et al.

(10) Patent No.: US 11,467,458 B1
(45) Date of Patent: Oct. 11, 2022

(54) CIRCUIT SUBSTRATE

(71) Applicant: Au Optronics Corporation, Hsinchu (TW)

(72) Inventors: Jia-Hong Ye, Hsinchu (TW); Kuo-Yu Huang, Hsinchu (TW)

(73) Assignee: AU OPTRONICS CORPORATION, Hsinchu (TW)

(*) Notice: Subject to any disclaimer, the term of this patent is extended or adjusted under 35 U.S.C. 154(b) by 0 days.

(21) Appl. No.: 17/506,652

(22) Filed: Oct. 20, 2021

(30) Foreign Application Priority Data

Jul. 19, 2021 (TW) .................................. 110126491

(51) Int. Cl.
*G02F 1/1362* (2006.01)
*G02F 1/1343* (2006.01)

(52) U.S. Cl.
CPC .. *G02F 1/136286* (2013.01); *G02F 1/134309* (2013.01); *G02F 1/136218* (2021.01); *G02F 1/136227* (2013.01)

(58) Field of Classification Search
None
See application file for complete search history.

(56) References Cited

U.S. PATENT DOCUMENTS

2012/0127412 A1* 5/2012 Lee ................... G02F 1/136286
349/139

FOREIGN PATENT DOCUMENTS

CN      102981330      6/2015

* cited by examiner

*Primary Examiner* — Phu Vu
(74) *Attorney, Agent, or Firm* — JCIPRNET

(57) ABSTRACT

A circuit substrate includes a substrate, an active device, a first signal line, a second signal line, a shielding electrode, a data line, a pixel electrode, and a common electrode. The first signal line is electrically connected to the active device, and includes a main portion and a connection portion connected to the main portion. The main portion extends along a first direction. The second signal line extends along a second direction. The second signal line is electrically connected to the connection portion. The shielding electrode overlaps the connection portion in a normal direction of the substrate. The shielding electrode and the second signal line belong to a same conductive layer. The data line is electrically connected to the active device. The common electrode is electrically connected to the shielding electrode.

15 Claims, 16 Drawing Sheets

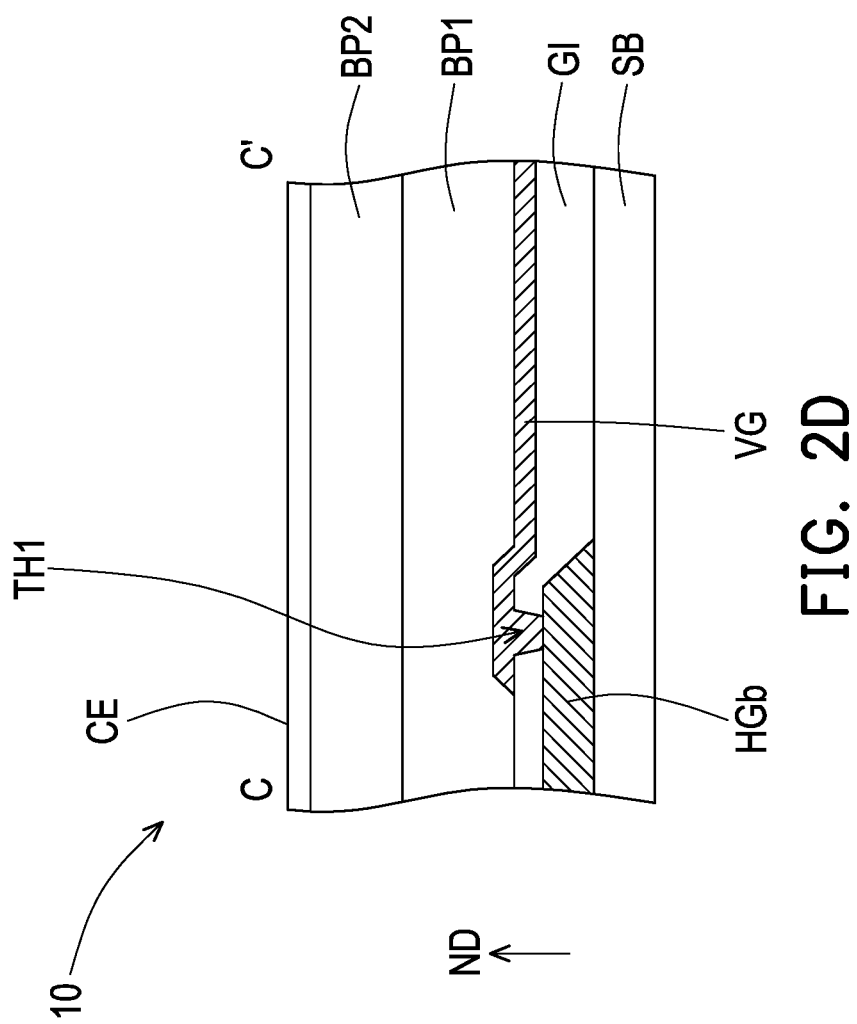

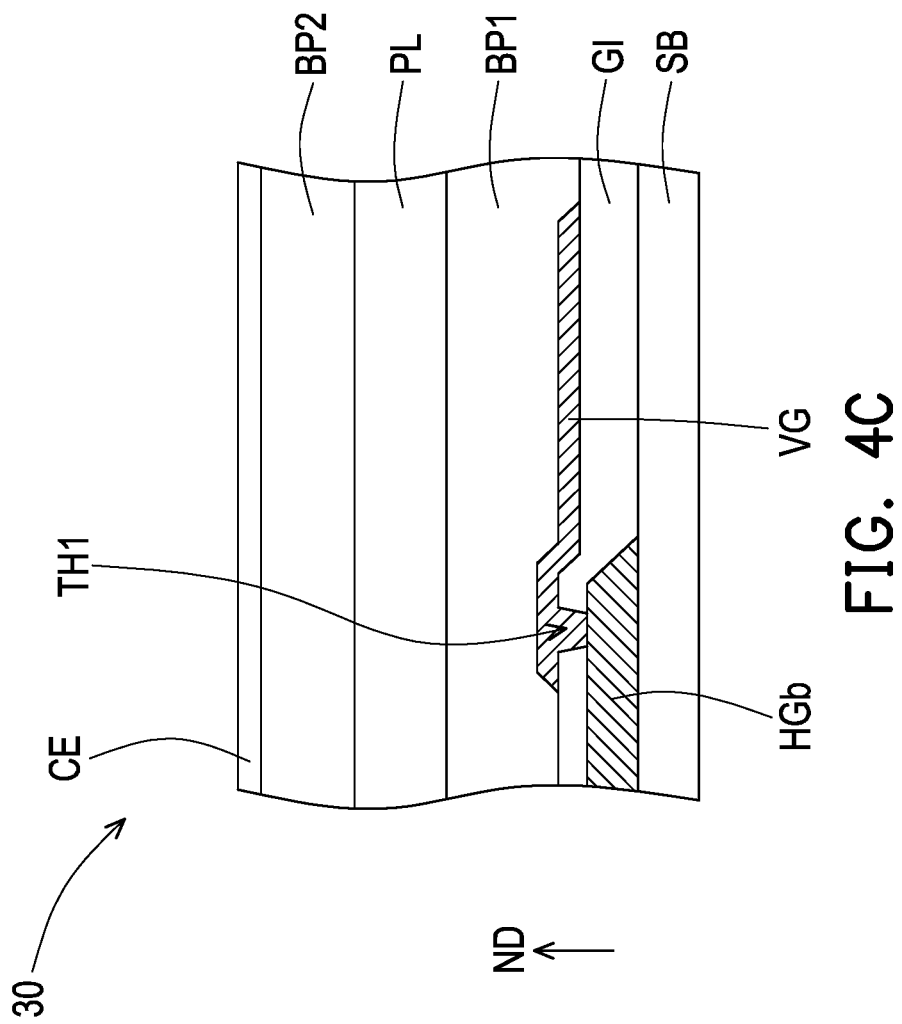

CIRCUIT SUBSTRATE

CROSS-REFERENCE TO RELATED APPLICATION

This application claims the priority benefit of Taiwanese application serial no. 110126491, filed on Jul. 19, 2021. The entirety of the above-mentioned patent application is hereby incorporated by reference herein and made a part of this specification.

BACKGROUND

Technical Field

This disclosure relates to a circuit substrate.

Description of Related Art

Cell phones, TVs, tablet PCs and other products with display devices have become indispensable electronic devices in modern life. In order to attract consumers to buy their products, many display device manufacturers are trying to reduce the bezel of the display device to make the display device have a better appearance. However, reducing the bezel of the display device will increase the density of the wires in the display device, which may affect the display quality of the display device. Specifically, as the density of the wires increases, the spacing between the wires of different signals decreases, and the electric field between the wires is easily generated and interferes with the display signal of the display device, causing the display quality of the display device to deteriorate.

SUMMARY

The disclosure provides a circuit substrate capable of reducing a peripheral region width and improve a problem of signal interference at connections of signal lines.

At least one embodiment of the disclosure provides a circuit substrate. The circuit substrate includes a substrate, an active device, a first signal line, a second signal line, a shielding electrode, a data line, a pixel electrode, and a common electrode. The active device is located on the substrate. The first signal line is electrically connected to the active device, and includes a main portion and a connection portion. The main portion extends along a first direction. The connection portion is connected to the main portion and extends outward from the main portion. The second signal line is located on the substrate and extends along a second direction. The second signal line is electrically connected to the connection portion. The shielding electrode overlaps the connection portion in a normal direction of the substrate. The shielding electrode and the second signal line belong to a same conductive layer. The data line is electrically connected to the active device. The pixel electrode is electrically connected to the active device. The common electrode overlaps the pixel electrode and is electrically connected to the shielding electrode.

At least one embodiment of the disclosure provides a circuit substrate. The circuit substrate includes a substrate, an active device, a first signal line, a second signal line, a shielding electrode, a data line, a pixel electrode, and a common electrode. The active device is located on the substrate. The first signal line extends along a first direction and is electrically connected to the active device. The second signal line is located on the substrate and extends along a second direction. The second signal line is electrically connected to the first signal line. The shielding electrode is adjacent to the second signal line and overlaps the first signal line in a normal direction of the substrate. The shielding electrode and the second signal line belong to a same conductive layer. The data line is electrically connected to the active device. The pixel electrode is electrically connected to the active device. The common electrode overlaps the pixel electrode and is electrically connected to the shielding electrode.

Based on the above, since the second signal line and the data line extend in a same direction, signal sources of the second signal line and the data line may be disposed in a more concentrated manner, thus reducing the peripheral region width. In addition, by providing the shielding electrode, interference from the first signal line to the pixel electrode may be reduced.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 2D is a schematic cross-sectional view of FIG. 2A taken along a line C to C'.

FIG. 4A to FIG. 4C are schematic cross-sectional views of a circuit substrate according to an embodiment of the disclosure.

DESCRIPTION OF THE EMBODIMENTS

Figure 1:
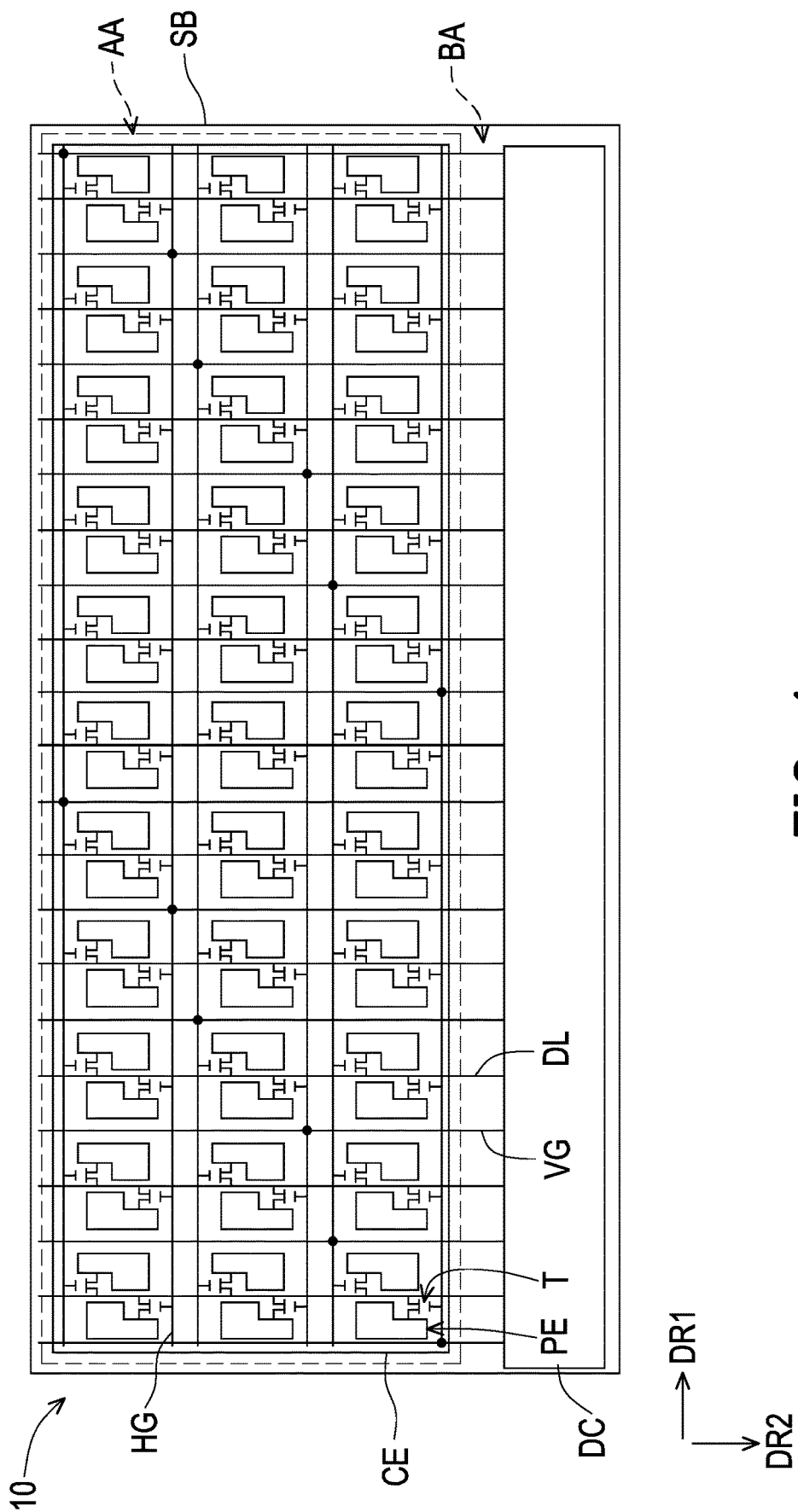
FIG. 1 is a schematic top view of a circuit substrate according to an embodiment of the disclosure.

FIG. 1 is a schematic top view of a circuit substrate 10 according to an embodiment of the disclosure.

Referring to FIG. 1, according to this embodiment, the circuit substrate 10 includes a substrate SB, an active device T, a first signal line HG, a second signal line VG, a data line DL, a pixel electrode PE, and a common electrode CE.

The substrate SB has an active region AA and a peripheral region BA located on at least one side of the active region AA. The substrate SB may be made of glass, quartz, organic polymers, or opaque/reflective materials (e.g., conductive materials, metals, wafers, ceramics, or other suitable materials) or other suitable materials. If conductive materials or metals are used, an insulating layer (not shown) is covered on the substrate SB to avoid short circuit problems.

The active device T is located on the substrate SB and located on the active region AA. The active device T is, for example, a thin film transistor. According to some embodiments, the active device T is a top gate electrode type thin film transistor, a bottom gate electrode type thin film transistor, a double gate electrode type thin film transistor or other forms of thin film transistors.

The first signal line HG is located on the substrate SB and located on the active region AA. The first signal line HG extends along a first direction DR1. The first signal line HG may be used as a scan line and is electrically connected to a gate of the active device T.

The second signal line VG is located on the substrate SB and extends along a second direction DR2. According to some embodiments, the second direction DR2 is perpendicular to the first direction DR1. The second signal line VG is electrically connected to the first signal line HG. According to some embodiments, the second signal line VG is directly connected to the first signal line HG, but the disclosure is not limited thereto. According to other embodiments, the second signal line VG is electrically connected to the first signal line HG through a bridge structure (not shown) of other different materials.

According to some embodiments, a shielding electrode (not shown) is disposed at an intersection of the first signal line HG and the second signal line VG. A structure of the shielding electrode will be described in subsequent embodiments.

A driving circuit DC is disposed on the substrate SB and located on the peripheral region BA. The second signal line VG extends from the peripheral region BA into the active region AA, and the first signal line HG is electrically connected to the driving circuit DC through the second signal line VG. According to some embodiments, each of the first signal line HG is electrically connected to one or more than two of the second signal lines VG. By electrically connecting the each of the first signal line HG to the more than two of the second signal lines VG, a problem of uneven signal distribution due to resistance-capacitance loading (RC loading) is improved. According to some embodiments, the circuit substrate 10 is suitable for automotive LCD panels and has a width in a horizontal direction (the first direction DR1) greater than a width in a vertical direction (the second direction DR2). Therefore, if only a single second signal line VG is used to provide signals to the first signal line HG, signals on the first signal line HG will be unevenly distributed. However, the disclosure does not limit the use of the circuit substrate 10 to automotive liquid crystal display panels, and the circuit substrate 10 may also be used for other types of liquid crystal display panels.

The data line DL is disposed on the substrate SB and extends along the second direction DR2. The data line DL is electrically connected to a source of the active device T. The data line DL extends from the peripheral region BA into the active region AA, and the active device T is electrically connected to the driving circuit DC through the data line DL. According to this embodiment, a left side and a right side of the data line DL are respectively connected to multiple active devices T to provide additional space for the second signal line VG. In other words, space needed to dispose the data line DL is saved according to this embodiment by Half Source Driving (HSD) technology, and then the saved space is used for the second signal line VG.

According to this embodiment, the second signal line VG and the data line DL extend along the same second direction DR2. Therefore, signal sources of the second signal line VG and the data line DL may be disposed in a more concentrated manner, for example, both in the driving circuit DC. According to some embodiments, the driving circuit DC includes multiple chips, and the second signal line VG and the data line DL are electrically connected to corresponding chips. The chips are, for example, bonded to the substrate SB using Chip on Film (COF) technology; however, the disclosure is not limited thereto. According to other embodiments, the driving circuit DC includes a gate driver-on-array (GOA) circuit electrically connected to the second signal line VG. The gate driver-on-array circuit is, for example, a circuit directly formed on the substrate SB through a deposition process.

The pixel electrode PE is disposed on the substrate SB and located on the active region AA. The pixel electrode PE is electrically connected to a drain of the active device T. The common electrode CE overlaps multiple pixel electrodes PE. According to some embodiments, the circuit substrate 10 is suitable for a liquid crystal display panel, and controls orientation of liquid crystal molecules (not shown) located on the pixel electrode PE through an electric field between the pixel electrode PE and the common electrode CE.

Figure 2A:
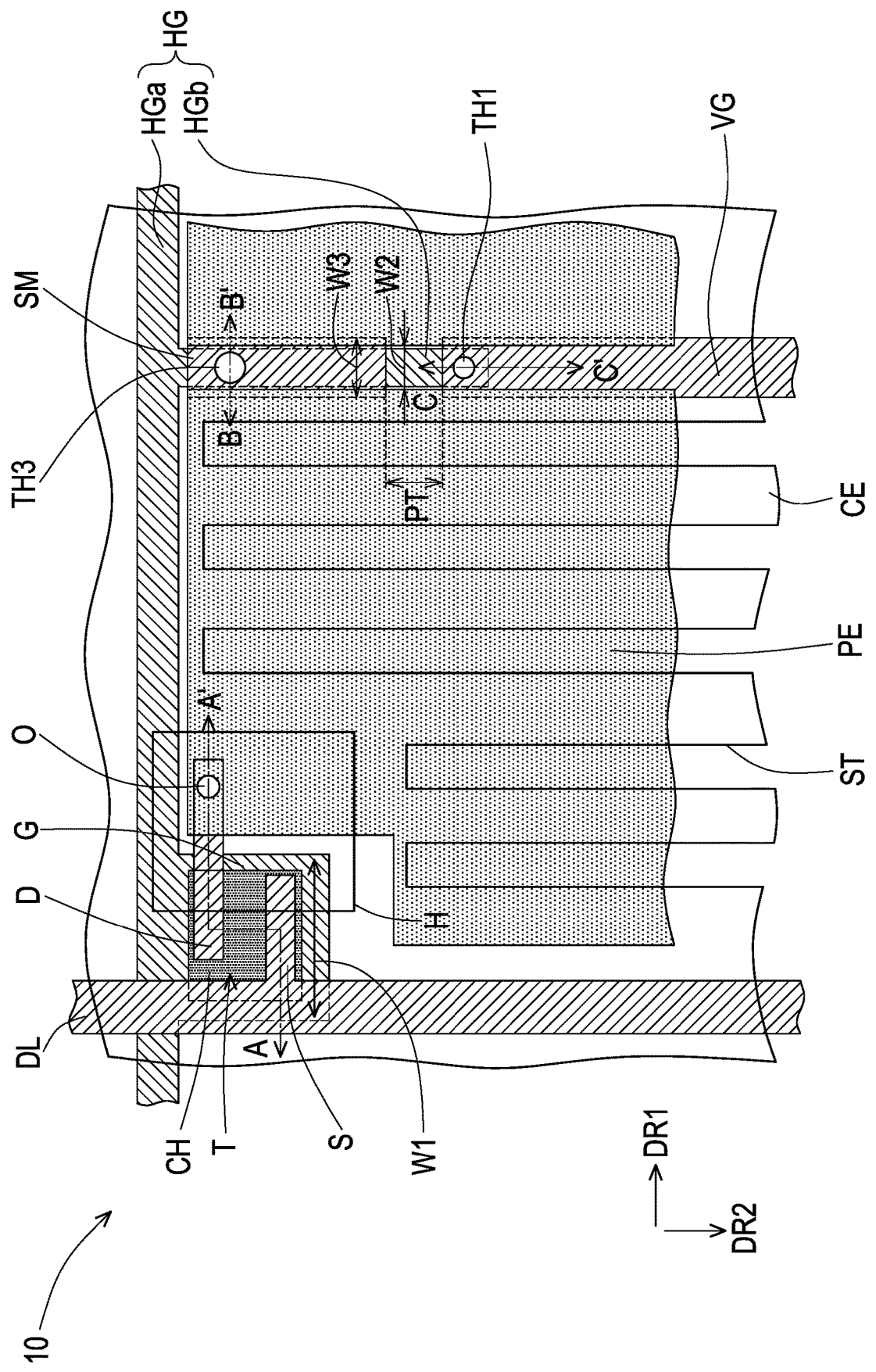
FIG. 2A is a schematic partial top view of a circuit substrate according to an embodiment of the disclosure.
Figure 2B:
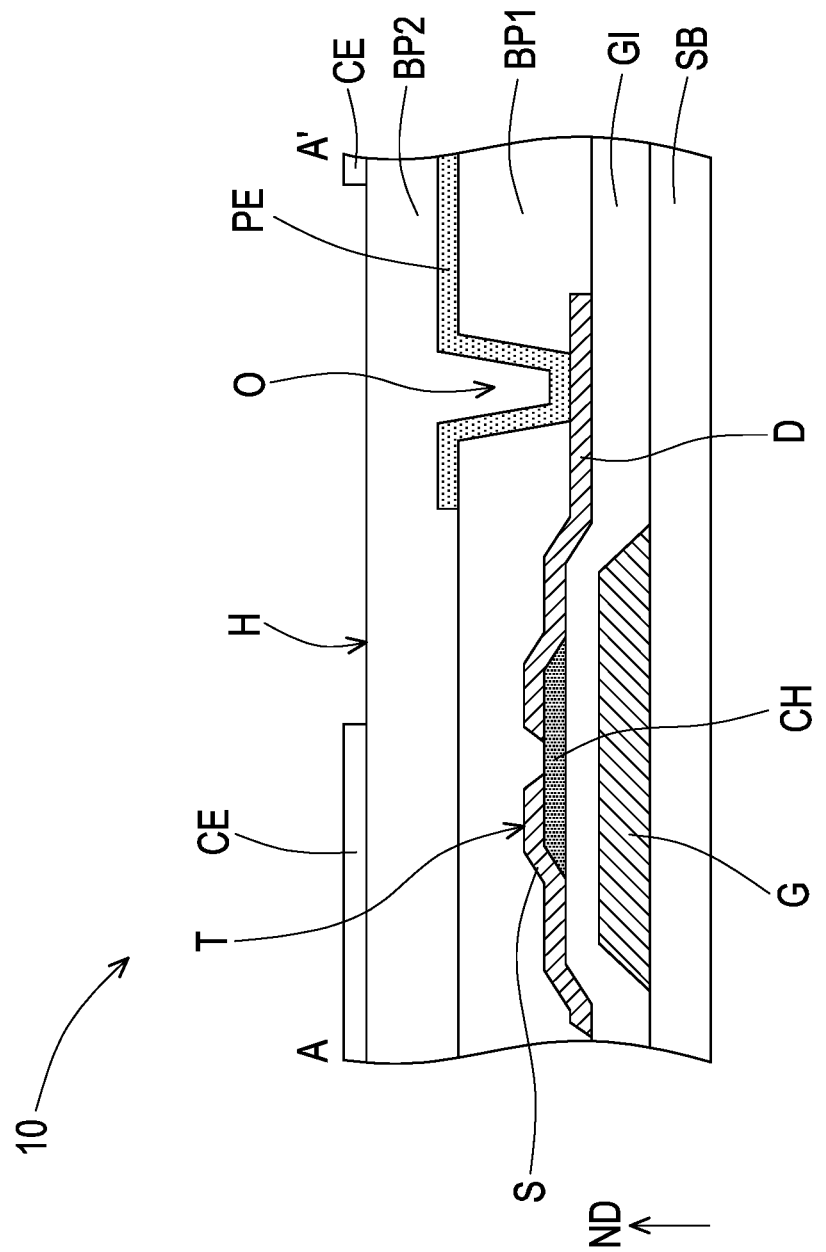
FIG. 2B is a schematic cross-sectional view of FIG. 2A taken along a line A to A'.
Figure 2C:
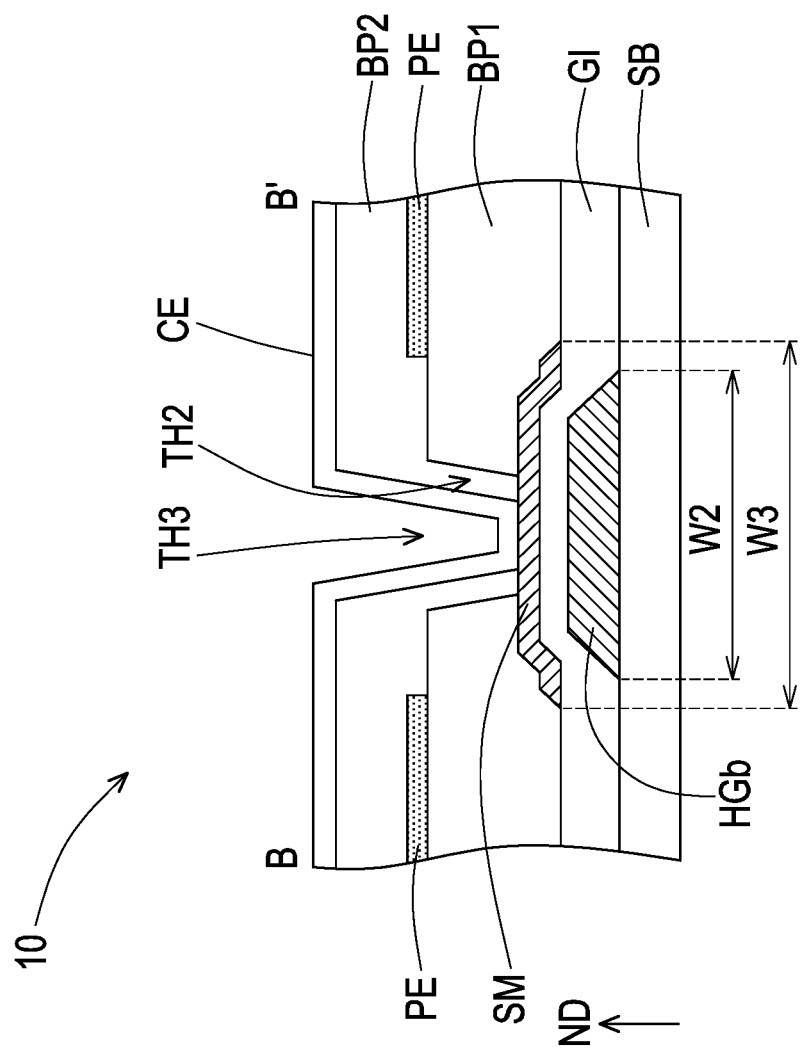
FIG. 2C is a schematic cross-sectional view of FIG. 2A taken along a line B to B'.

FIG. 2A is a schematic partial top view of a circuit substrate 10 according to an embodiment of the disclosure. FIG. 2B is a schematic cross-sectional view of FIG. 2A taken along a line A to A'. FIG. 2C is a schematic cross-sectional view of FIG. 2A taken along a line B to B'. FIG. 2D is a schematic cross-sectional view of FIG. 2A taken along a line C to C'.

Referring to FIG. 2A to FIG. 2D, the circuit substrate 10 includes a substrate SB (not shown in FIG. 2A), an active device T, a first signal line HG, a second signal line VG, a shielding electrode SM, a data line DL, a pixel electrode PE, and s common electrode CE. The active device T includes a gate G, a channel layer CH, a source S, and a drain D.

The gate G and the first signal line HG are located on the substrate SB. The gate G is electrically connected to the first signal line HG. According to this embodiment, the gate G and the first signal line HG belong to a same conductive layer, for example, a first conductive layer. In other words, the first conductive layer is formed by a patterning process (e.g., a photolithography and etching process), and the first conductive layer includes the gate G and the first signal line HG. The first conductive layer may be a single-layer structure or a multi-layer structure. According to some embodiments, a material of the gate G and the first signal line HG includes gold, silver, copper, aluminum, molybdenum, titanium, tantalum, other metals, alloys of the foregoing metals, or other conductive materials.

According to this embodiment, the first signal line HG includes a main portion HGa and a connection portion HGb. The main portion HGa extends along a first direction DR1. The connection portion HGb is connected to the main portion HGa and extends outward from the main portion HGa. According to some embodiments, each of the first signal line HG includes the main portion HGa and multiple connection portions HGb connected to the main portion HGa, and the connection portions HGb extend outward from the main portion HGa in a direction parallel to a second direction DR2.

According to this embodiment, a width W1 of the gate G in the first direction DR1 is greater than a width W2 of the connection portion HGb in the first direction DR1. According to some embodiments, the width W2 of the connection portion HGb in the first direction DR1 is 1.0 μm to 5.0 μm.

A gate insulating layer GI is located on the gate G and the first signal line HG. The channel layer CH is located on the gate insulating layer GI, and the gate insulating layer GI is sandwiched between the channel layer CH and the gate G. The channel layer CH may be a single-layer structure or a multi-layer structure. A material of the channel layer CH includes amorphous silicon, polycrystalline silicon, microcrystalline silicon, monocrystalline silicon, organic semiconductor materials, oxide semiconductor materials (e.g. indium zinc oxide, indium gallium zinc oxide, or other suitable materials, or a combination of the foregoing), or other suitable materials, or containing dopant in the materials, or a combination of the foregoing.

The second signal line VG, the shielding electrode SM, the data line DL, the source S, and the drain D are located on the gate insulating layer GI. According to this embodiment, the second signal line VG, the shielding electrode SM, the data line DL, the source S, and the drain D belong to a same conductive layer, for example, a second conductive layer. In other words, the second conductive layer is formed by a patterning process (e.g., a photolithography and etching process), and the second conductive layer includes the second signal line VG, the shielding electrode SM, the data line DL, the source S, and the drain D. The second conductive layer may be a single-layer structure or a multi-layer structure. According to some embodiments, a material of the second signal line VG, the shielding electrode SM, the data line DL, the source S, and the drain D includes gold, silver, copper, aluminum, molybdenum, titanium, tantalum, other metals, alloys of the foregoing metals, or other conductive materials.

The data line DL extends along the second direction DR2. The source S is electrically connected to the data line DL. The source S and the drain D are electrically connected to the channel layer CH. According to this embodiment, the source S and the drain D directly contact an upper surface of the channel layer CH. According to some embodiments, there is also an ohmic contact layer (not shown) between the source S and the channel layer CH and between the drain D and the channel layer CH, but the disclosure is not limited thereto.

The second signal line VG extends along the second direction DR2. The second signal line VG is electrically connected to the connection portion HGb of the first signal line HG. According to this embodiment, the gate insulating layer GI has a through hole TH1, and the second signal line VG is filled in the through hole TH1 and directly connected to the connection portion HGb. According to some embodiments, each of the first signal line HG includes multiple connection portions HGb, and the connection portions HGb of the each of the first signal line HG are electrically connected to multiple second signal lines VG to improve the problem of uneven signal distribution due to resistance-capacitance loading (RC loading).

The shielding electrode SM overlaps the connection portion HGb of the first signal line HG in a normal direction ND of the substrate SB. According to some embodiments, the shielding electrode SM and the second signal line VG are aligned with each other in the second direction DR2, and the shielding electrode SM is separated from the second signal line VG. According to this embodiment, a width W3 of the shielding electrode SM in the first direction DR1 is greater than the width W2 of the connection portion HGb in the first direction DR1. According to some embodiments, the width W3 of the shielding electrode SM in the first direction DR1 is 1.5 μm to 5.5 μm. According to some embodiments, an electric field between the connection portion HGb and the pixel electrode PE is reduced by disposing the shielding electrode SM, thereby avoiding a problem of uneven brightness (Mura) of the display caused by the connection portion HGb. According to some embodiments, a spacing PT between the shielding electrode SM and the second signal line VG is 2.0 μm to 5.0 μm. According to some embodiments, the shielding electrode SM partially covers the connection portion HGb of the first signal line HG, and the shielding electrode SM does not overlap the main portion HGa of the first signal line HG in the normal direction ND of the substrate SB, but the disclosure is not limited thereto. According to other embodiments, the shielding electrode SM not only overlaps the connection portion HGb of the first signal line HG in the normal direction ND of the substrate SB, but also overlaps a portion of the main portion HGa of the first signal line HG, thereby further reducing the electric field between the first signal line HG and the pixel electrode PE.

A first insulating layer BP1 is located on the active device T, the second signal line VG, and the shielding electrode SM. The pixel electrode PE is located on the first insulating layer BP1, and the pixel electrode PE is electrically connected to the drain D of the active device T through a through hole O penetrating the first insulating layer BP1. According to this embodiment, an edge of the pixel electrode PE overlaps the second signal line VG and the shielding electrode SM in the normal direction ND of the substrate SB, but the disclosure is not limited thereto. According to other embodiments, the edge of the pixel electrode PE does not overlap the second signal line VG and shielding electrode SM in the normal direction ND of the substrate SB.

A material of the pixel electrode PE may be a transparent pixel electrode, a reflective pixel electrode, or a transflective pixel electrode. A material of the transparent pixel electrode includes metal oxides, such as indium tin oxide, indium zinc oxide, aluminum tin oxide, aluminum zinc oxide, indium germanium zinc oxide, or other suitable oxides or a stack of at least two of the foregoing. A material of the reflective pixel electrode includes metal materials.

A second insulating layer BP2 is located on the first insulating layer BP1 and the pixel electrode PE. According to this embodiment, the first insulating layer BP1 has a through hole TH2 overlapping the shielding electrode SM, and the second insulating layer BP2 has a through hole TH3 overlapping the shielding electrode SM. The through hole TH3 overlaps the through hole TH2. According to some embodiments, the through hole TH3 is smaller than the through hole TH2, and the second insulating layer BP2 is selectively partially filled in the through hole TH2, but the disclosure is not limited thereto. According to other embodiments, the through hole TH3 is larger than the through hole TH2, and the second insulating layer BP2 is not filled in the through hole TH2.

The common electrode CE is located on the second insulating layer BP2, and the common electrode CE overlaps the pixel electrode PE. The common electrode CE is electrically connected to the shielding electrode SM through the through hole TH3 penetrating the second insulating layer BP2. In other words, the shielding electrode SM and the common electrode CE have a same voltage applied. According to this embodiment, the common electrode CE has an opening H overlapping the active device T. By disposing the opening H, an effect of the common electrode CE on the active device T may be reduced. According to this embodiment, the common electrode CE has multiple slits ST overlapping the pixel electrode PE. An electric field between the pixel electrode PE and the common electrode CE may pass through the slits ST, and the electric field is used to change orientation of the liquid crystal molecules (not shown) located on the common electrode CE. The common electrode CE is a transparent conductive material, such as indium tin oxide, indium zinc oxide, aluminum tin oxide, aluminum zinc oxide, indium germanium zinc oxide, or other suitable oxides or a stack of at least two of the foregoing.

Geometry and dimensions of the pixel electrode PE and the common electrode CE may be adjusted according to requirements. The drawings of the disclosure are for illustrative purposes only and are not intended to limit the geometry of the pixel electrode PE and the common electrode CE.

Based on the above, by disposing the second signal line VG, the chips or driving circuits on the circuit substrate 10 may be disposed in a more concentrated manner, thus reducing the peripheral region width of the circuit substrate 10. In addition, by disposing the shielding electrode SM, a problem of signal interference at a connection of the first signal line HG and the second signal line VG may be improved.

Figure 3A:
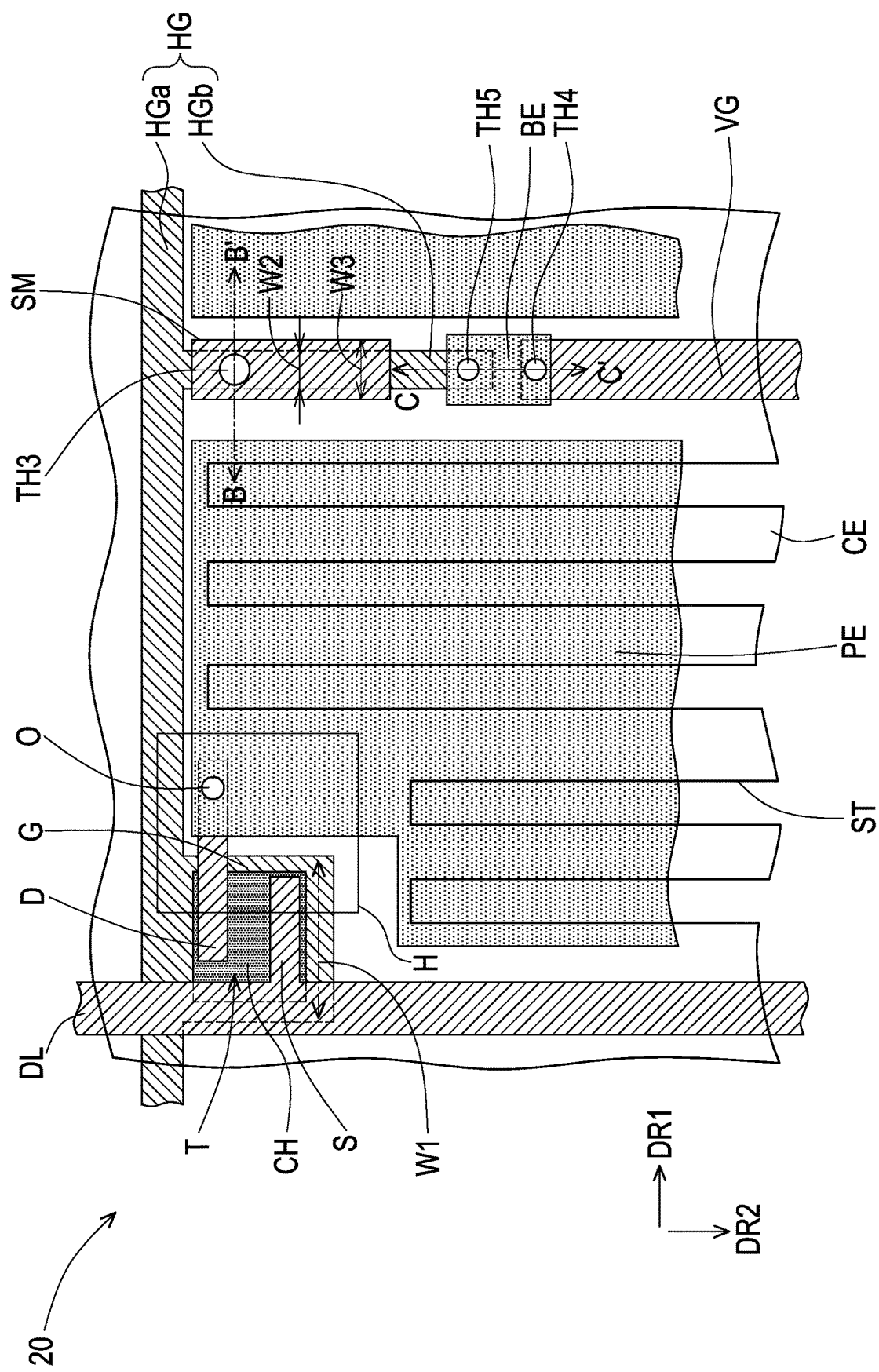
FIG. 3A is a schematic partial top view of a circuit substrate according to an embodiment of the disclosure.
Figure 3B:
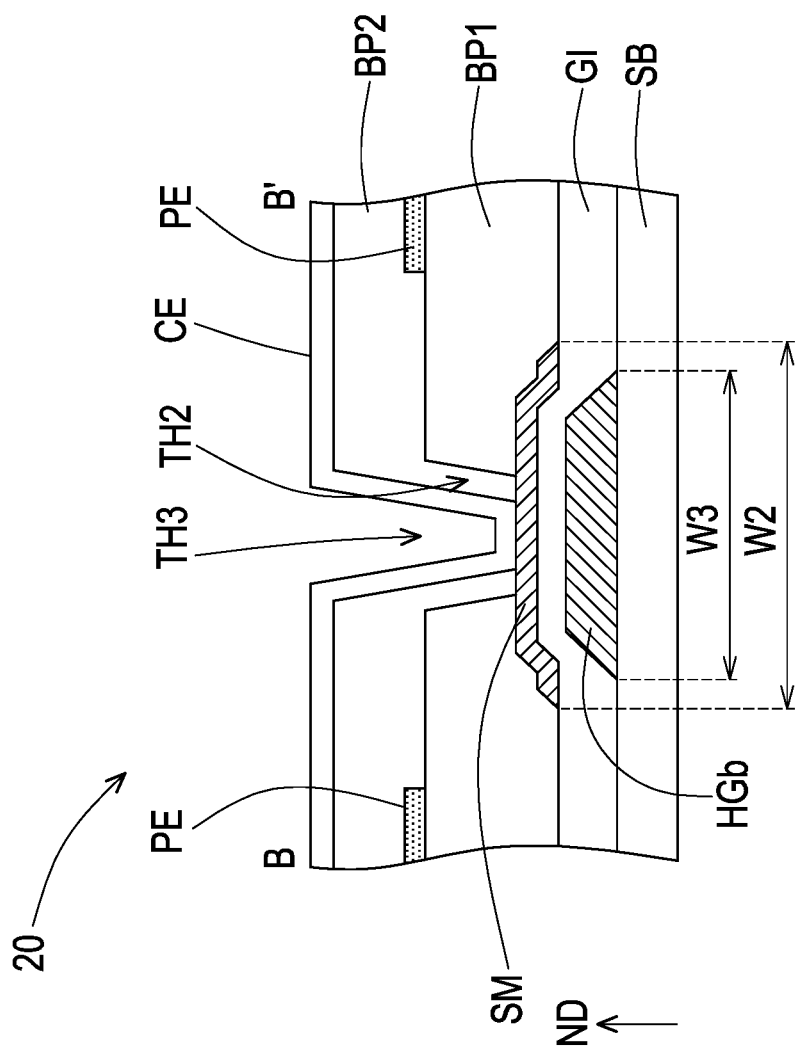
FIG. 3B is a schematic cross-sectional view of FIG. 3A taken along a line B to B'.
Figure 3C:
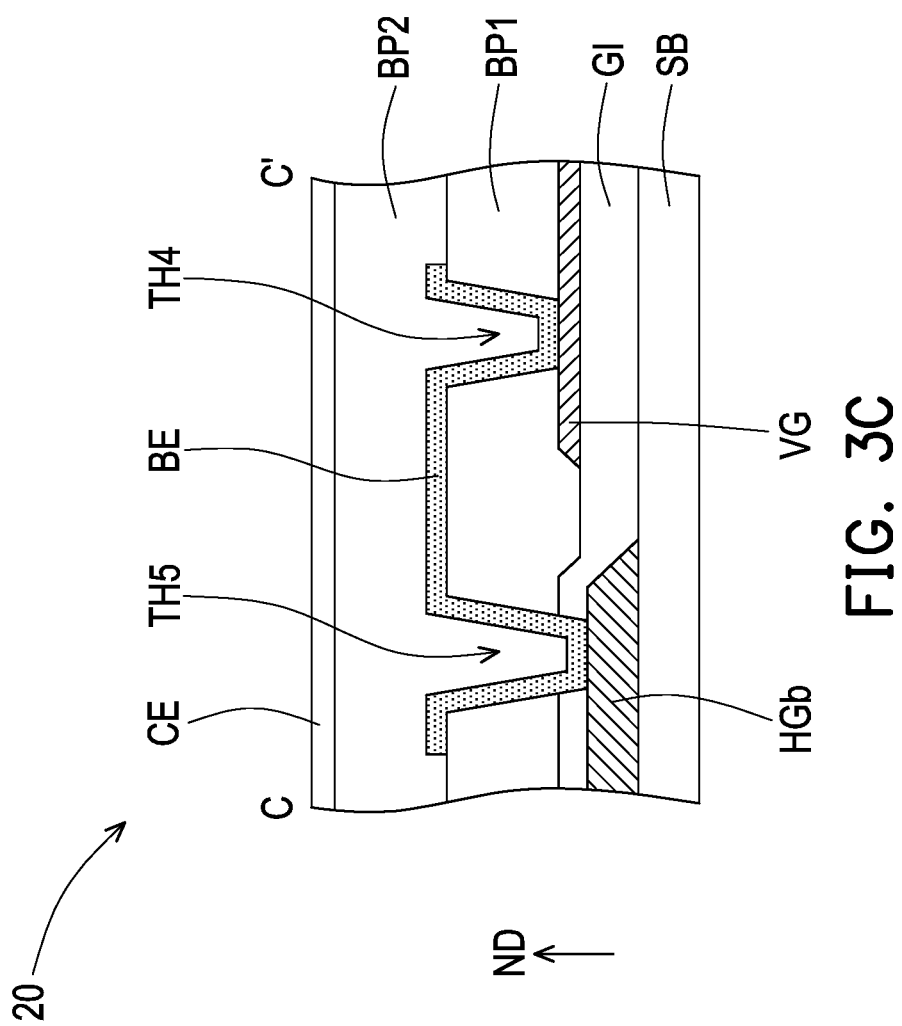
FIG. 3C is a schematic cross-sectional view of FIG. 3A taken along a line C to C'.

FIG. 3A is a schematic partial top view of a circuit substrate according to an embodiment of the disclosure. FIG. 3B is a schematic cross-sectional view of FIG. 3A taken along a line B to B'. FIG. 3C is a schematic cross-sectional view of FIG. 3A taken along a line C to C'.

It should be noted here that the embodiments of FIG. 3A to FIG. 3C follow numeral references and parts of the embodiments of FIG. 1 to FIG. 2D, where the same numeral references are used to indicate the same or similar components, and the description of the same technical content is omitted. The description of the omitted parts can be found in the preceding embodiments, and will not be repeated in the following embodiments.

A circuit substrate 20 of FIG. 3A to FIG. 3C differs from the circuit substrate 10 of FIG. 2A to FIG. 2D in that the circuit substrate 20 includes a bridge structure BE.

The bridge structure BE is located on the first insulating layer BP1. According to this embodiment, the bridge structure BE and the pixel electrode PE belong to a same conductive layer. In other words, the bridge structure BE and the pixel electrode PE are formed by a patterning process (e.g., a photolithography and etching process). The bridge structure BE and the pixel electrode PE include same materials.

According to this embodiment, the second signal line VG is not in direct contact with the first signal line HG, and the bridge structure BE electrically connects the second signal line VG to the connection portion HGb of the first signal line HG. According to this embodiment, the bridge structure BE is electrically connected to the second signal line VG through a through hole TH4 penetrating the first insulating layer BP1, and the bridge structure BE is electrically connected to the first signal line HG through a through hole TH5 penetrating the first insulating layer BP1 and the gate insulating layer GI. The through hole TH4 and the through hole TH5 are formed, for example, in a same etching process, and the first signal line HG and the second signal line VG may be used as etch stop layers for the etching process, so as to reduce a number of photomasks required for the process and to reduce the manufacturing cost.

Based on the above, by disposing the second signal line VG, chips or driving circuits on the circuit substrate 20 may be disposed in a more concentrated manner, thus reducing a peripheral region width of the circuit substrate 20. In addition, by disposing the shielding electrode SM, a problem of signal interference at a connection of the first signal line HG and the second signal line VG may be improved.

Figure 4A:
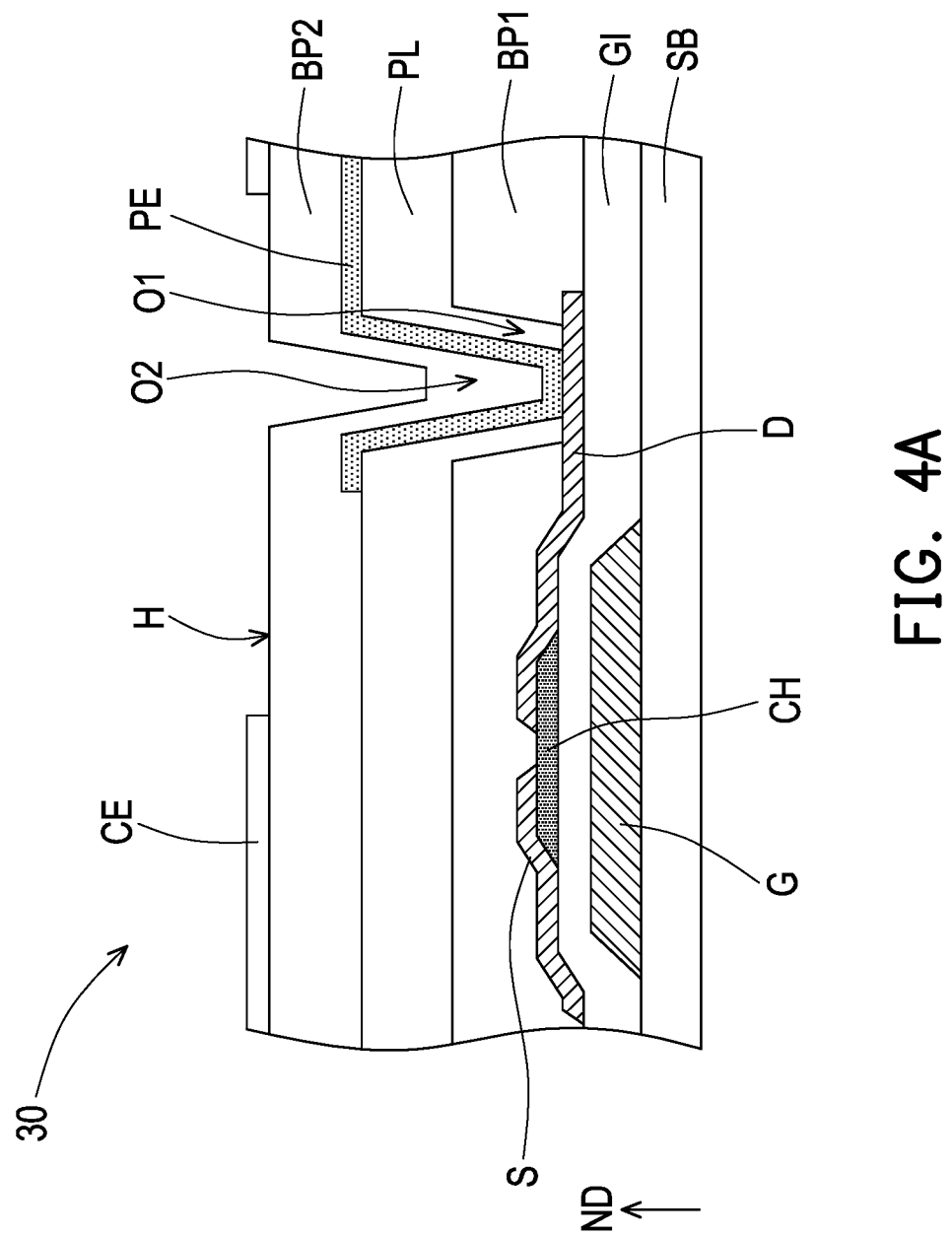
Figure 4B:
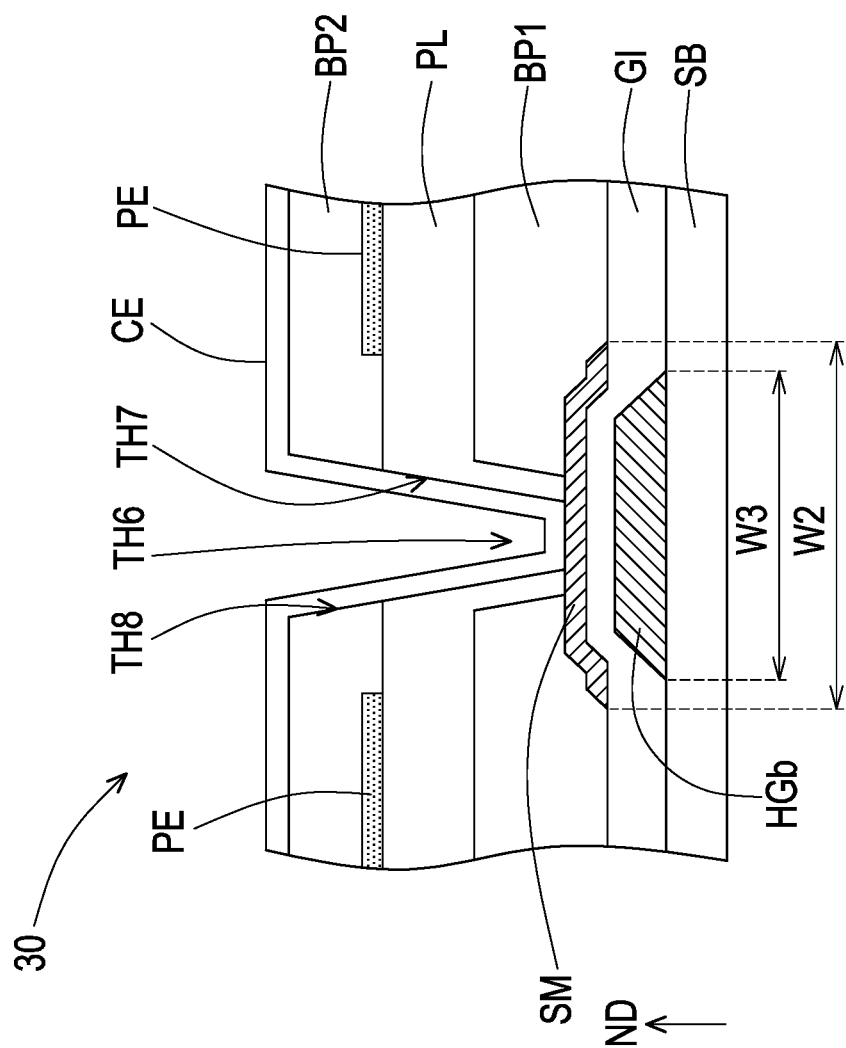

FIG. 4A to FIG. 4C are schematic cross-sectional views of a circuit substrate according to an embodiment of the disclosure. It should be noted here that the embodiments of FIG. 4A to FIG. 4C follow numeral references and parts of the embodiments of FIG. 1 to FIG. 2D, where the same numeral references are used to indicate the same or similar components, and the description of the same technical content is omitted. The description of the omitted parts can be found in the preceding embodiments, and will not be repeated in the following embodiments.

A circuit substrate 30 of FIG. 4A to FIG. 4C differs from the circuit substrate 10 of FIG. 2A to FIG. 2D in that the circuit substrate 30 further includes a flat layer PL.

Referring to FIG. 4A to FIG. 4C, the first insulating layer BP1 is located on the active device T, the shielding electrode SM, and the second signal line VG. The flat layer PL is located on the first insulating layer BP1. The first insulating layer BP1 has a through hole O1 overlapping the drain D of the active device T, and the flat layer PL has a through hole O2 overlapping the drain D of the active device T. The through hole O1 overlaps the through hole O2. According to some embodiments, the through hole O2 is smaller than the through hole O1, and the flat layer PL is selectively partially filled in the through hole O1, but the disclosure is not limited thereto. According to other embodiments, the through hole O2 is larger than the through hole O1, and the flat layer PL is not filled in the through hole O1.

The pixel electrode PE is located on the flat layer PL, and the pixel electrode PE is electrically connected to the drain D of the active device T through the through hole O1 penetrating the first insulating layer BP1 and the through hole O2 penetrating the flat layer PL.

According to some embodiments, the flat layer PL is an organic insulating layer suitable for Ultra/Super High Aperture (UHA/SHA) technology, and the organic insulating layer may increase a distance between the pixel electrode PE and a metal conductor (e.g. the drain D), thereby reducing capacitance and increasing an aperture rate of a pixel structure.

The second insulating layer BP2 is located on the flat layer PL and the pixel electrode PE. The common electrode CE is located on the second insulating layer BP2. The common electrode is electrically connected to the shielding electrode SM through a through hole TH8 penetrating the second insulating layer BP2, a through hole TH7 penetrating the flat layer PL, and a through hole TH6 penetrating the first insulating layer BP1. According to some embodiments, the through hole TH7 is smaller than the through hole TH6, and the flat layer PL is selectively partially filled in the through hole TH6, but the disclosure is not limited thereto. According to other embodiments, the through hole TH7 is larger than the through hole TH6, and the flat layer PL is not filled in the through hole TH6. According to some embodiments, the first insulating layer BP1 and the second insulating layer BP2 are organic insulating layers or inorganic insulating layers.

Based on the above, by disposing the second signal line VG, chips or driving circuits on the circuit substrate 30 may be disposed in a more concentrated manner, thus reducing a peripheral region width of the circuit substrate 30. In addition, by disposing the shielding electrode SM, a problem of signal interference at a connection of the first signal line HG and the second signal line VG may be improved.

Figure 5:
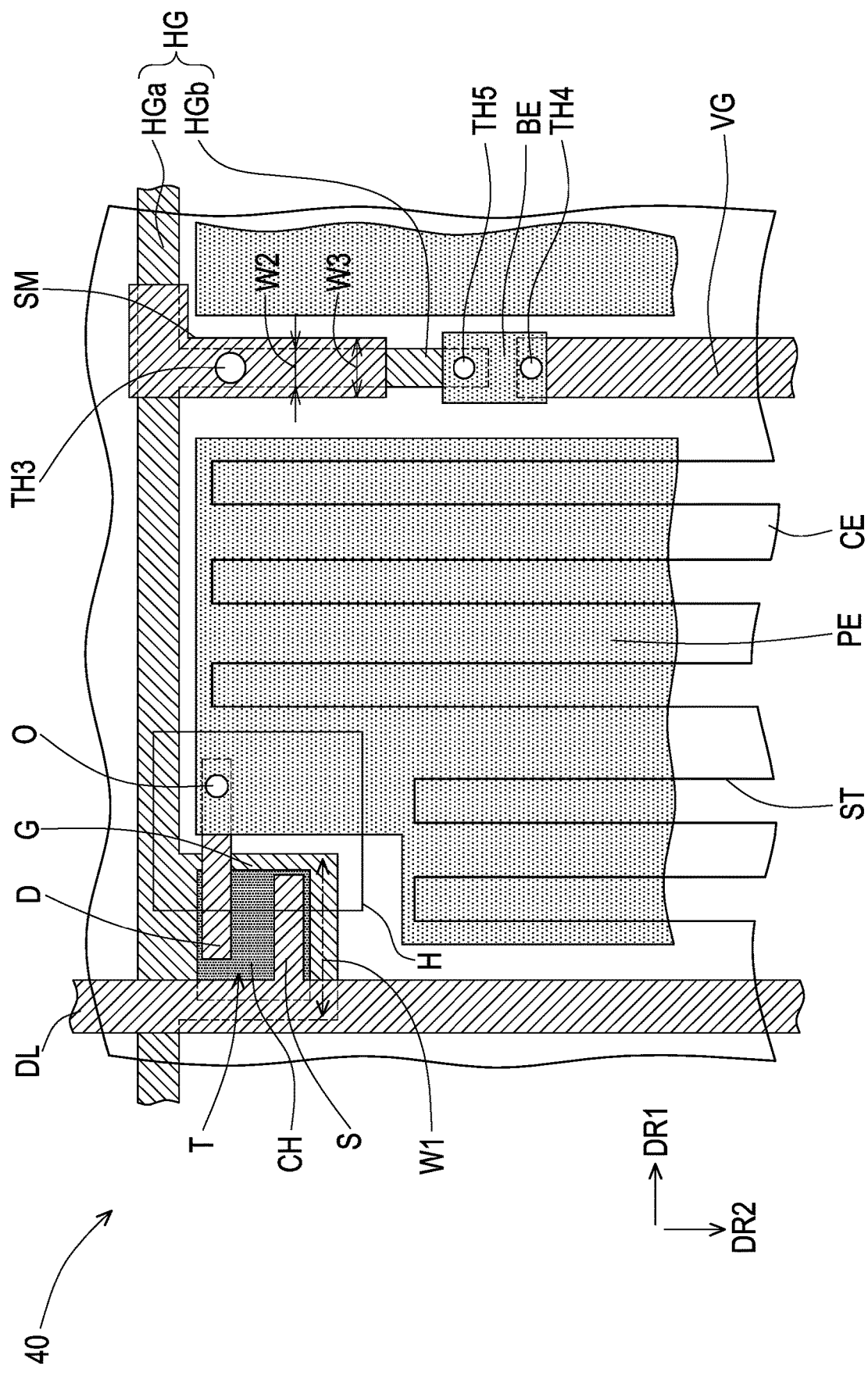
FIG. 5 is a schematic partial top view of a circuit substrate according to an embodiment of the disclosure.

FIG. 5 is a schematic partial top view of a circuit substrate according to an embodiment of the disclosure. It should be noted here that the embodiment of FIG. 5 follows numeral references and parts of the embodiments of FIG. 3A to FIG. 3C, where the same numeral references are used to indicate the same or similar components, and the description of the same technical content is omitted. The description of the omitted parts can be found in the preceding embodiments, and will not be repeated in the following embodiments.

A circuit substrate 40 of FIG. 5 differs from the circuit substrate 20 of FIG. 3A to FIG. 3C in that the shielding electrode SM of the circuit substrate 40 is L-shaped.

Referring to FIG. 5, according to this embodiment, the shielding electrode SM overlaps the connection portion HGb and a portion of the main portion HGa of the first signal line HG in the normal direction of the substrate to further reduce the electric field between the first signal line HG and the pixel electrode PE.

Based on the above, by disposing the second signal line VG, chips or driving circuits on the circuit substrate 40 may be disposed in a more concentrated manner, thus reducing a peripheral region width of the circuit substrate 40. In addition, by disposing the shielding electrode SM, a problem of signal interference at a connection of the first signal line HG and the second signal line VG may be improved.

Figure 6:
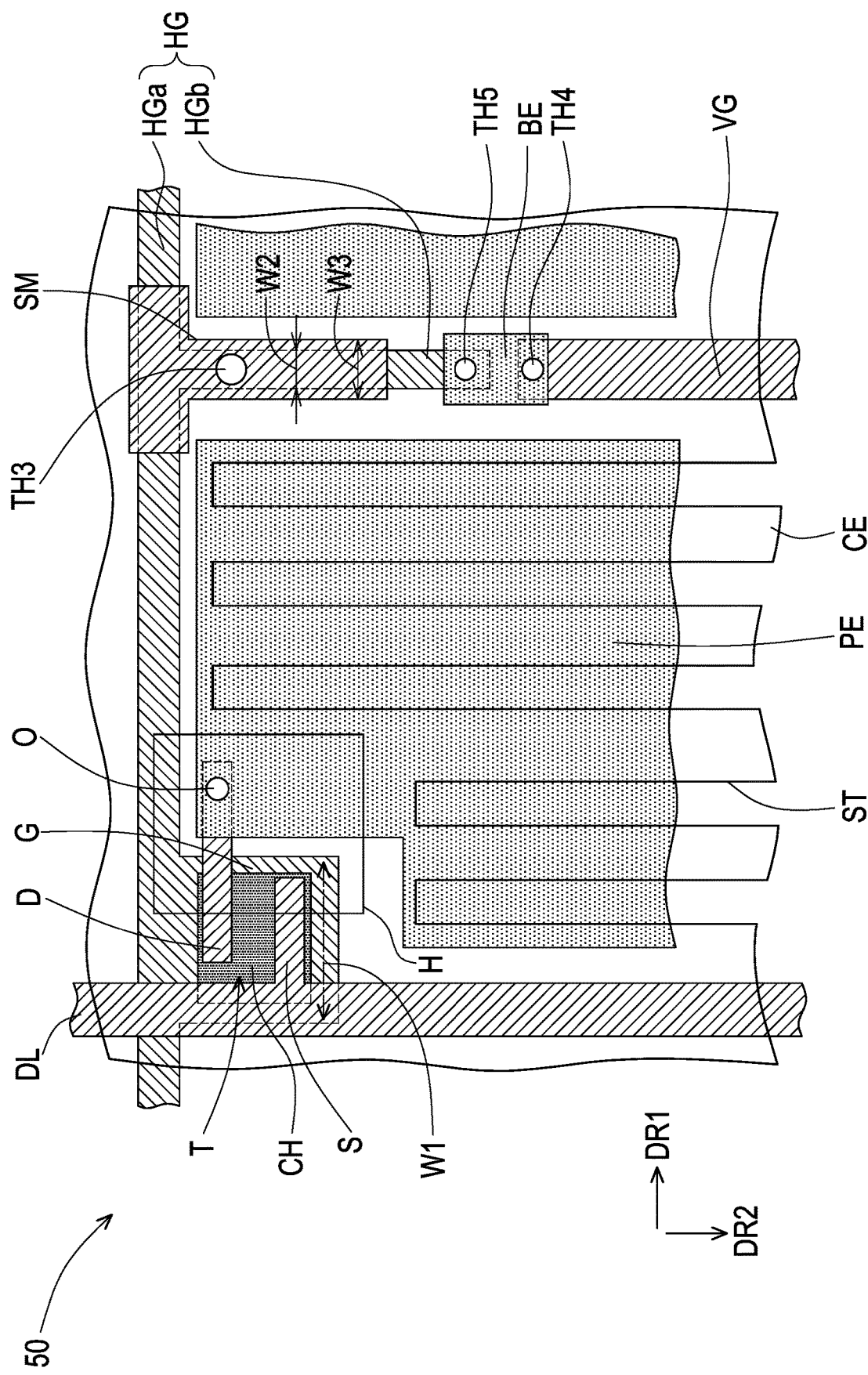
FIG. 6 is a schematic partial top view of a circuit substrate according to an embodiment of the disclosure.

FIG. 6 is a schematic partial top view of a circuit substrate according to an embodiment of the disclosure. It should be noted here that the embodiment of FIG. 6 follows numeral references and parts of the embodiments of FIG. 3A to FIG. 3C, where the same numeral references are used to indicate the same or similar components, and the description of the same technical content is omitted. The description of the omitted parts can be found in the preceding embodiments, and will not be repeated in the following embodiments.

A circuit substrate 50 of FIG. 6 differs from the circuit substrate 20 of FIG. 3A to FIG. 3C in that the shielding electrode SM of the circuit substrate 50 is T-shaped.

Referring to FIG. 6, according to this embodiment, the shielding electrode SM overlaps the connection portion HGb and a portion of the main portion HGa of the first signal line HG in the normal direction of the substrate to further reduce the electric field between the first signal line HG and the pixel electrode PE.

Based on the above, by disposing the second signal line VG, chips or driving circuits on the circuit substrate 50 may be disposed in a more concentrated manner, thus reducing a peripheral region width of the circuit substrate 50. In addition, by disposing the shielding electrode SM, a problem of signal interference at a connection of the first signal line HG and the second signal line VG may be improved.

Figure 7:
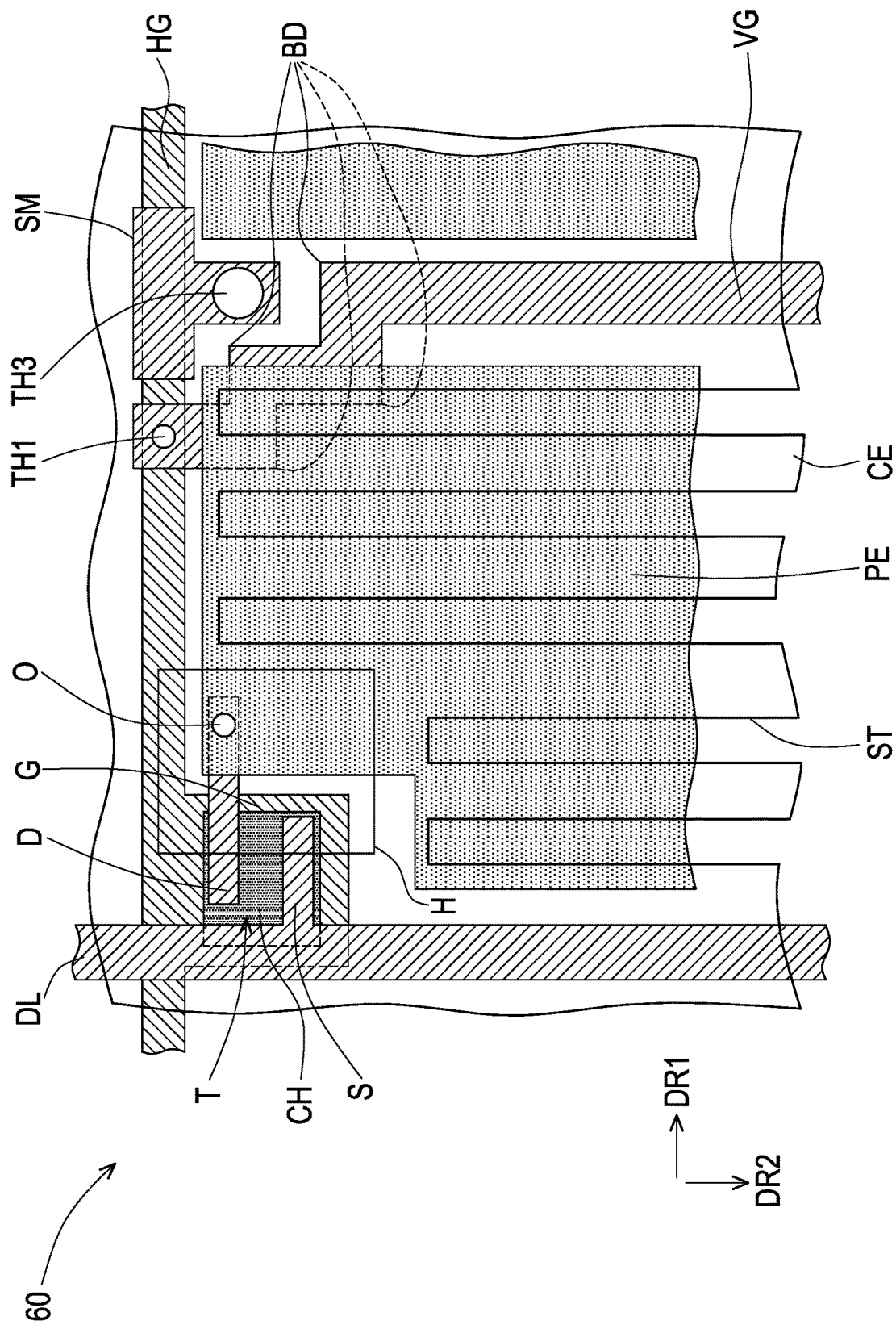
FIG. 7 is a schematic partial top view of a circuit substrate according to an embodiment of the disclosure.

FIG. 7 is a schematic partial top view of a circuit substrate according to an embodiment of the disclosure. It should be noted here that the embodiment of FIG. 7 follows numeral references and parts of the embodiment of FIG. 6, where the same numeral references are used to indicate the same or similar components, and the description of the same technical content is omitted. The description of the omitted parts can be found in the preceding embodiments, and will not be repeated in the following embodiments.

A circuit substrate 60 of FIG. 7 differs from the circuit substrate 50 of FIG. 6 in that the second signal line VG of the circuit substrate 60 has multiple bends BD near the shielding electrode SM.

Referring to FIG. 7, according to this embodiment, the circuit substrate 60 includes a substrate, an active device T, a first signal line HG, a second signal line VG, a shielding electrode SM, a data line DL, a pixel electrode PE, and a common electrode CE.

The active device T is located on the substrate. The first signal line HG extends along the first direction DR1 and is electrically connected to the active device T. The second signal line VG is located on the substrate and extends along the second direction DR2. The second signal line VG is electrically connected to the first signal line HG. According to this embodiment, the second signal line VG is directly connected to a portion of the first signal line HG extending along the first direction DR1.

The shielding electrode SM is adjacent to the second signal line VG, and overlaps the first signal line HG in the normal direction of the substrate. According to this embodiment, since the shielding electrode SM and the second signal line VG belong to a same conductive layer, and the second signal line VG has multiple bends BD near the shielding electrode SM, so that the second signal line VG is not in direct contact with the shielding electrode SM. According to this embodiment, the second signal line VG is directly connected to the first signal line HG. According to some embodiments, the shielding electrode SM is T-shaped or L-shaped.

The data line DL is electrically connected to the active device T. The pixel electrode PE is electrically connected to the active device T. The common electrode CE overlaps the pixel electrode PE and is electrically connected to the shielding electrode SM.

Based on the above, by disposing the second signal line VG, chips or driving circuits on the circuit substrate 60 may be disposed in a more concentrated manner, thus reducing a peripheral region width of the circuit substrate 60. In addition, by disposing the shielding electrode SM, a problem of signal interference at a connection of the first signal line HG and the second signal line VG may be improved.

Figure 8:
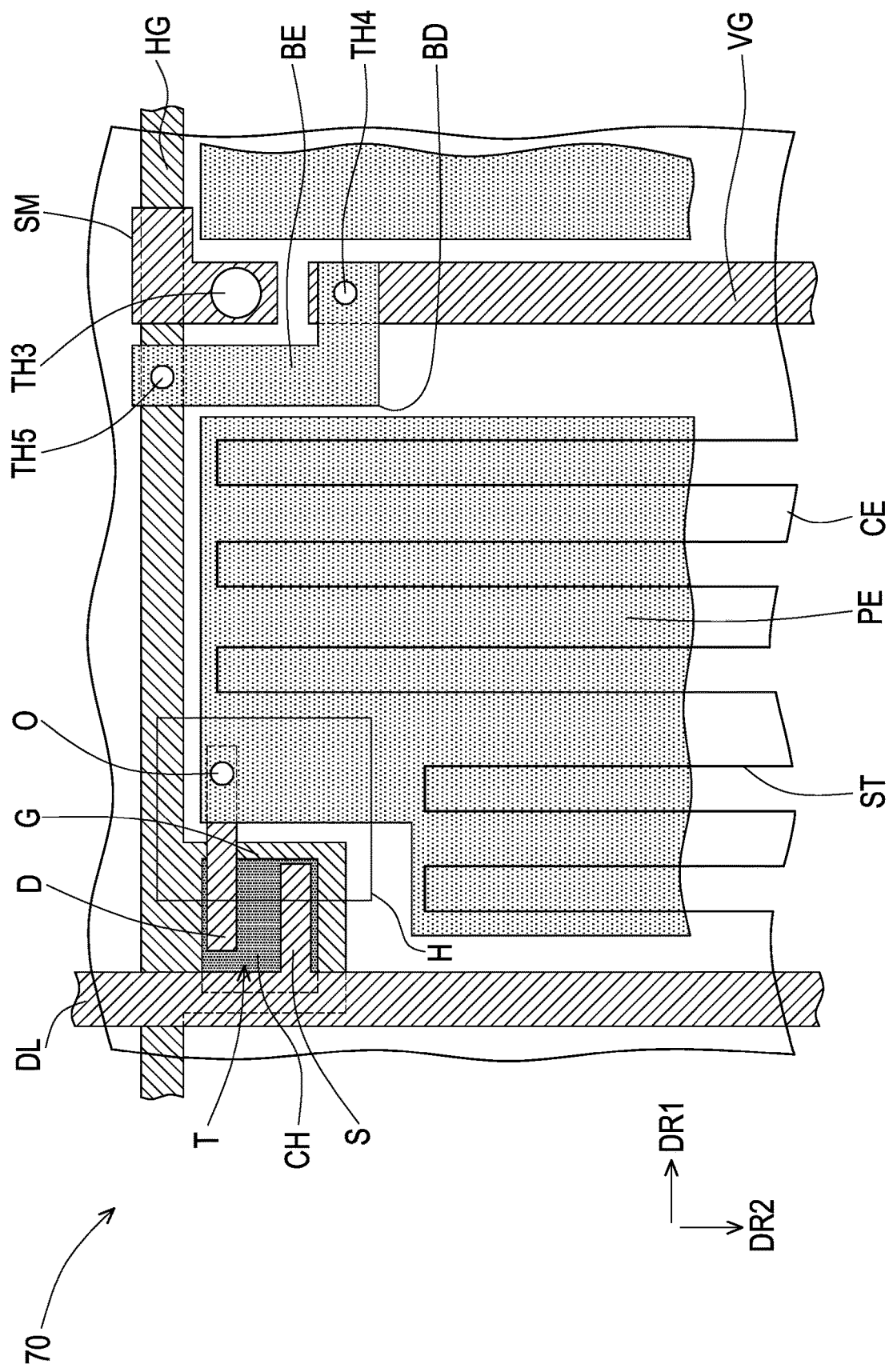
FIG. 8 is a schematic partial top view of a circuit substrate according to an embodiment of the disclosure.

FIG. 8 is a schematic partial top view of a circuit substrate according to an embodiment of the disclosure. It should be noted here that the embodiment of FIG. 8 follows numeral references and parts of the embodiment of FIG. 7, where the same numeral references are used to indicate the same or similar components, and the description of the same technical content is omitted. The description of the omitted parts can be found in the preceding embodiments, and will not be repeated in the following embodiments.

A circuit substrate 70 of FIG. 8 differs from the circuit substrate 60 of FIG. 7 in that the circuit substrate 70 further includes a bridge structure BE.

According to this embodiment, the bridge structure BE and the pixel electrode PE belong to a same conductive layer. In other words, the bridge structure BE and the pixel electrode PE are formed by a patterning process (e.g., a photolithography and etching process). The bridge structure BE and the pixel electrode PE include same materials.

According to this embodiment, the second signal line VG is not in direct contact with the first signal line HG, and the bridge structure BE electrically connects the second signal line VG to the first signal line HG. According to this embodiment, the bridge structure BE is electrically connected to the second signal line VG through a through hole TH4 (similar to the through hole in FIG. 3C) penetrating the first insulating layer BP1, and the bridge structure BE is electrically connected to the first signal line HG through a through hole TH5 (similar to the through hole in FIG. 3C) penetrating the first insulating layer BP1 and the gate insulating layer GI. The through hole TH4 and the through hole TH5 are formed, for example, in a same etching process, and the first signal line HG and the second signal line VG may be used as etch stop layers for the etching process, so as to reduce a number of photomasks required for the process and to reduce the manufacturing cost.

According to this embodiment, the bridge structure BE has a bend BD near the shielding electrode SM, so that the bridge structure BE avoids a through hole TH3 on the shielding electrode SM.

Based on the above, by disposing the second signal line VG, chips or driving circuits on the circuit substrate 70 may be disposed in a more concentrated manner, thus reducing a peripheral region width of the circuit substrate 70. In addition, by disposing the shielding electrode SM, a problem of signal interference at a connection of the first signal line HG and the second signal line VG may be improved.

Figure 9:
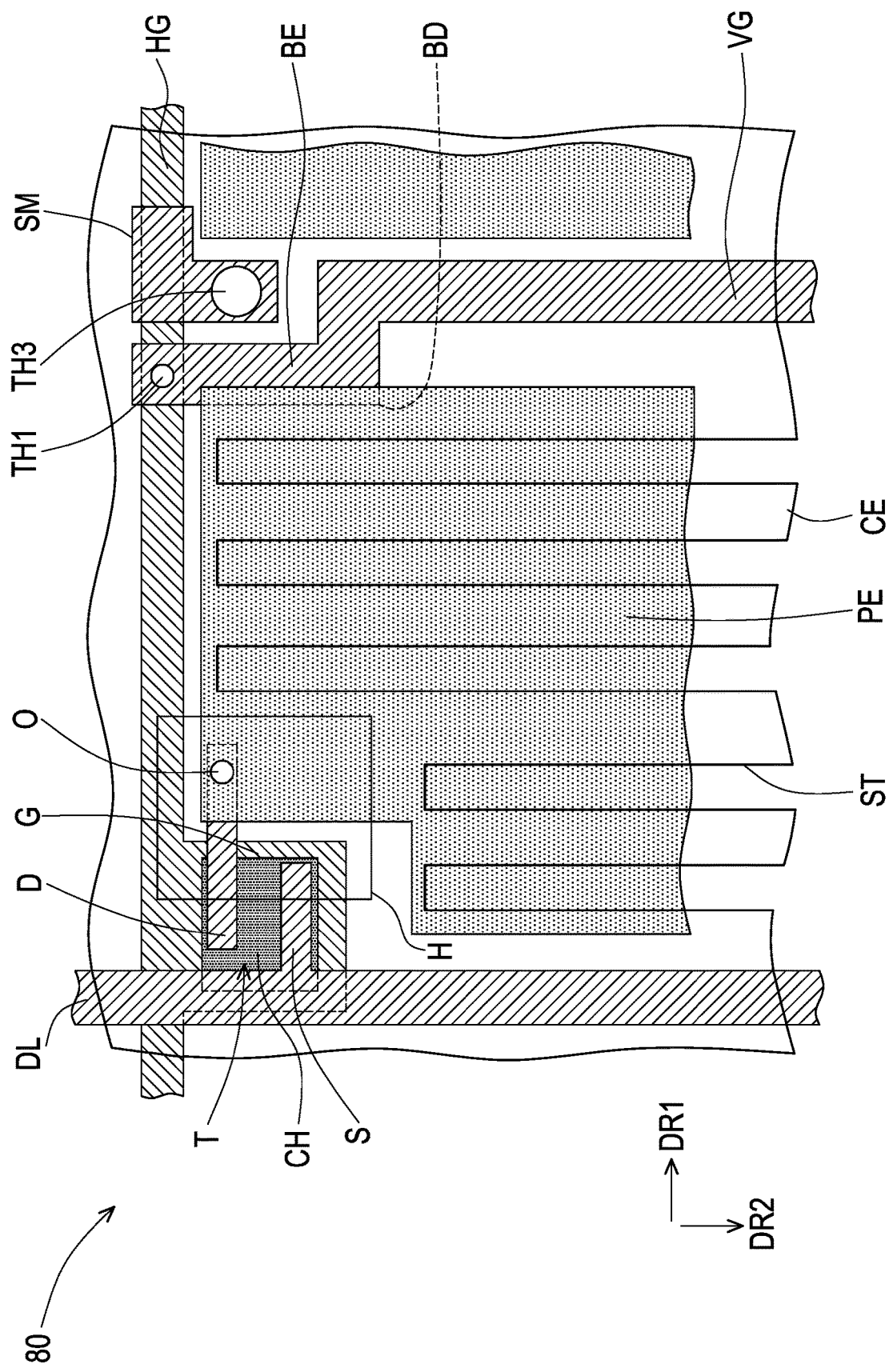
FIG. 9 is a schematic partial top view of a circuit substrate according to an embodiment of the disclosure.

FIG. 9 is a schematic partial top view of a circuit substrate according to an embodiment of the disclosure. It should be noted here that the embodiment of FIG. 9 follows numeral references and parts of the embodiment of FIG. 7, where the same numeral references are used to indicate the same or similar components, and the description of the same technical content is omitted. The description of the omitted parts can be found in the preceding embodiments, and will not be repeated in the following embodiments.

A circuit substrate 80 of FIG. 9 differs from the circuit substrate 60 of FIG. 7 in that the shielding electrode SM of the circuit substrate 80 is L-shaped.

According to this embodiment, the shielding electrode SM is L-shaped, and the second signal line VG has multiple bends BD near the shielding electrode SM, so that the second signal line VG avoids the shielding electrode SM. According to this embodiment, the second signal line VG is directly connected to the first signal line HG. For example, the second signal line VG is directly connected to the first signal line HG through a through hole TH1 of a gate insulating layer.

Based on the above, by disposing the second signal line VG, chips or driving circuits on the circuit substrate 80 may be disposed in a more concentrated manner, thus reducing a peripheral region width of the circuit substrate 80. In addition, by disposing the shielding electrode SM, a problem of signal interference at a connection of the first signal line HG and the second signal line VG may be improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A circuit substrate comprising:
a substrate;
an active device located on the substrate;
a first signal line electrically connected to the active device and comprising:
a main portion extending along a first direction; and
a connection portion connected to the main portion and extending outward from the main portion;
a second signal line located on the substrate and extending along a second direction, wherein the second signal line is electrically connected to the connection portion;
a shielding electrode overlapping the connection portion in a normal direction of the substrate, and the shielding electrode and the second signal line belong to a same conductive layer;
a data line electrically connected to the active device;
a pixel electrode electrically connected to the active device; and
a common electrode overlapping the pixel electrode and electrically connected to the shielding electrode.

2. The circuit substrate according to claim 1 further comprising:
a first insulating layer located on the active device and the shielding electrode, wherein the pixel electrode is located on the first insulating layer, and the pixel electrode is electrically connected to the active device through a first through hole penetrating the first insulating layer; and
a second insulating layer located on the first insulating layer and the pixel electrode, wherein the common electrode is located on the second insulating layer, and the common electrode is electrically connected to the shielding electrode through a second through hole penetrating the second insulating layer.

3. The circuit substrate according to claim 1 further comprising:
a first insulating layer located on the active device and the shielding electrode;
a flat layer located on the first insulating layer, wherein the pixel electrode is located on the flat layer, and the pixel electrode is electrically connected to the active device through a first through hole penetrating the first insulating layer and a second through hole penetrating the flat layer;
a second insulating layer located on the flat layer and the pixel electrode, wherein the common electrode is located on the second insulating layer, and the common electrode is electrically connected to the shielding electrode through a third through hole penetrating the second insulating layer, a fourth through hole penetrating the flat layer, and a fifth through hole penetrating the first insulating layer.

4. The circuit substrate according to claim 1, wherein the second signal line is directly connected to the connection portion.

5. The circuit substrate according to claim 1 further comprising:
a bridge structure electrically connecting the second signal line to the connection portion, wherein the bridge structure and the pixel electrode belong to a same conductive layer.

6. The circuit substrate according to claim 1, wherein a width of the shielding electrode in the first direction is greater than a width of the connection portion in the first direction.

7. The circuit substrate according to claim 1, wherein the shielding electrode is T-shaped or L-shaped.

8. The circuit substrate according to claim 1 further comprising a plurality of active devices, wherein a left side and a right side of the data line are respectively connected to a plurality of active devices.

9. The circuit substrate according to claim 1 further comprising a plurality of second signal lines, wherein the first signal line comprises a plurality of connection portions, and the connection portions are respectively electrically connected to the second signal lines.

10. A circuit substrate comprising:
a substrate;

an active device located on the substrate;
a first signal line extending along a first direction and electrically connected to the active device;
a second signal line located on the substrate and extending along a second direction, wherein the second signal line is electrically connected to the first signal line;
a shielding electrode adjacent to the second signal line and overlapping the first signal line in a normal direction of the substrate, wherein the shielding electrode and the second signal line belong to a same conductive layer;
a data line electrically connected to the active device;
a pixel electrode electrically connected to the active device; and
a common electrode overlapping the pixel electrode and electrically connected to the shielding electrode.

11. The circuit substrate according to claim 10, wherein the second signal line is directly connected to the first signal line.

12. The circuit substrate according to claim 10 further comprising:
a bridge structure electrically connecting the second signal line to the first signal line, wherein the bridge structure and the pixel electrode belong to a same conductive layer.

13. The circuit substrate according to claim 12, wherein the bridge structure has a bend near the shielding electrode.

14. The circuit substrate according to claim 10, wherein the second signal line has a plurality of bends near the shielding electrode.

15. The circuit substrate according to claim 10, wherein the shielding electrode is T-shaped or L-shaped.

* * * * *